US00RE35502E

United States Patent [19]

Hughes et al.

[11] E Patent Number: Re. 35,502

[45] Reissued Date of Patent: May 13, 1997

[54] EVAPORATOR

[75] Inventors: Gregory G. Hughes, Milwaukee; Rodney A. Struss; Michael J. Boero, both of Racine, all of Wis.

[73] Assignee: Modine Manufacturing Company, Racine, Wis.

[21] Appl. No.: 327,024

[22] Filed: Oct. 21, 1994

Related U.S. Patent Documents

Reissue of:

[64] Patent No.: 5,157,944
Issued: Oct. 27, 1992
Appl. No.: 662,747
Filed: Mar. 1, 1991

[51] Int. Cl.[6] ..... F25B 39/02

[52] U.S. Cl. ..... 62/515; 165/139; 165/144; 165/173; 165/176

[58] Field of Search ..... 62/515; 165/139, 165/144, 173, 176

[56] References Cited

U.S. PATENT DOCUMENTS 2,956,419 10/1960 Boling ..... 62/515
4,516,630 5/1985 Yamaguchi ..... 165/139
4,928,755 5/1990 Doty et al. ..... 165/174

*Primary Examiner*—Ronald C. Capossela
*Attorney, Agent, or Firm*—Wood, Phillips, VanSanten, Clark & Mortimer

[57] ABSTRACT

Inefficiency in heat exchange in an evaporator for a refrigeration system due to maldistribution of incoming refrigerant may be reduced in a structure wherein a plurality of hydraulically parallel flow paths are defined by tubes (20) having ends (84) in the interior of a header (10). Refrigerant inlets (70, 72) are provided for the header (10) at opposite ends (62, 64) thereof to generate streams (78, 80) of incoming refrigerant which impinge upon one another to dissipate the kinetic energy and/or momentum of the streams (78 and 80) which in turn results in an improved distribution of the refrigerant within the header (10). Refrigerant outlets are provided for a header. The outlets are at opposite ends thereof to generate two streams of outgoing refrigerant which reduces outlet resistance and thus provides for more uniform flow of the refrigerant.

26 Claims, 1 Drawing Sheet

EVAPORATOR

Matter enclosed in heavy brackets [ ] appears in the original patent but forms no part of this reissue specification; matter printed in italics indicates the additions made by reissue.

FIELD OF THE INVENTION

This invention relates to evaporators, and more particularly, to an improved flow circuit for an evaporator intended to be used in a refrigeration system.

BACKGROUND OF THE INVENTION

While there seems to be a general perception that any given heat exchanger structure may be utilized interchangeably for any of a variety of heat exchange operations, for example, as an oil cooler, as a radiator, as a condenser, as an evaporator, etc., this is frequently not the case, particularly where one of the heat exchange fluids is undergoing a phase change during the heat exchange operation as, for example, from liquid to vapor or the reverse. Simply stated, the change of phase, in many instances, considerably alters the mechanics of the heat exchange operation; and this is particularly true in the case of evaporators used in refrigeration systems.

In such a system, one heat exchange fluid will be directed toward the evaporator principally in the liquid phase. In some instances, it may be entirely in the liquid phase while in others, it may be in a mixed phase of both liquid and vapor. In any event, the refrigerant is passed through an expansion valve or a capillary into a low pressure area which includes the evaporator itself. The refrigerant downstream of the expansion valve or capillary will initially be in the mixed phase. That is, made up of both refrigerant liquid and refrigerant vapor.

Because the refrigerant is flowing within the system, it will have kinetic energy which in turn will be related to its mass. And, of course, for a given volume of refrigerant in the liquid phase versus the same volume of refrigerant in the vapor phase, the kinetic energy, and thus momentum, will be substantially greater because of the much higher density of the liquid phase material.

As a consequence, as the mixed phase refrigerant enters a manifold or a header in the evaporator which is provided for distributing refrigerant to several different flow paths through the evaporator as is typical, the momentum of the liquid phase component of the incoming refrigerant often tends to cause the refrigerant to flow rapidly down a large portion or even all of the length of the manifold to essentially pool or puddle at one end thereof. Consequently, flow paths connected to the manifold near the inlet frequently receive principally vapor phase refrigerant while those more remote from the inlet receive principally liquid phase refrigerant. Since vapor phase refrigerant has already absorbed the latent heat of vaporization, those flow paths conducting a principally vapor phase refrigerant cannot absorb all of the heat that they are capable of absorbing whereas those receiving principally liquid phase refrigerant, because of thermal conductivity constraints in the evaporator design, cannot absorb all of the heat that the liquid phase refrigerant flowing therethrough is capable of absorbing.

The same factors influence vaporization in each pass of a multiple pass evaporator. Additionally, outlet resistance may also cause a maldistribution of refrigerant among the flow paths.

The obvious result is poor efficiency of operation of the evaporator.

The present invention is directed to overcoming one or more of the above problems.

SUMMARY OF THE INVENTION

It is the principal object of the invention to provide a new and improved evaporator for a refrigerant. More specifically, it is an object of the invention to provide a new and improved flow circuit for an evaporator so that the same may operate with improved efficiency.

An exemplary embodiment of the invention achieves the foregoing in an evaporator for refrigerant which includes a means defining a plurality of hydraulically parallel flow paths for a fluid to be evaporated. A header includes an elongated channel at one end of the flow paths which is in fluid communication with each of the flow paths. A pair of ports are provided to the channel at opposite ends thereof.

In a preferred embodiment, the header is a tube and the channel is defined by the interior of the tube.

Preferably, the tube is a straight tube and the ports are directed generally axially along the tube interior.

In one embodiment, the flow path defining means comprise a plurality of spaced individual tubes extending between an inlet header and an outlet header and fins are disposed between the spaced tubes.

The invention also contemplates that the flow path defining means provide a multiplicity of passes of each of the flow paths across the heat exchange area.

In a highly preferred embodiment, the evaporator includes a plurality of tubes in hydraulic parallel and in spaced relation to one another with fins extending between the tubes. An elongated inlet header extends between the tubes and is in fluid communication with the interior each of the tubes. Two spaced inlets are provided to the header and are directed towards each other for generating two streams of entering fluid that impinge upon each other to dissipate kinetic energy and provide more uniform distribution of fluid to the tubes.

In a preferred embodiment, there is also provided an elongated outlet header spaced from the inlet header which is in fluid communication with the tubes at locations spaced from the inlet header. Two outlets are provided from the outlet header, one at each end thereof.

This embodiment of the invention also contemplates the use of a generally C-shaped conduit interconnecting the inlets. A tee is provided in the conduit through which the fluid to be evaporated may be introduced into the conduit for flow to both of the inlets.

Preferably, the tubes are arranged in two or more rows wherein one row is in direct fluid communication with the inlet header and the other row is in direct fluid communication with the outlet header. Two or more intermediate headers are in fluid communication with the one of the rows having the inlet header and a pair of conduits connect said intermediate headers at opposite ends thereof. In particular, the intermediate header in direct fluid communication with the row in direct communication with the inlet header has a pair of outlets at opposite ends thereof and are directed away from each other to generate two streams of exiting fluid to reduce outlet resistance. The intermediate header in direct fluid communication with the row in direct communication with the outlet header has a pair of inlets at opposite ends thereof and are directed toward each other to generate two streams of entering fluid to dissipate kinetic energy. Furthermore, the intermediate headers are in side-by-side relation and the intermediate header outlet is connected to the adjacent intermediate header inlet.

Other objects and advantages will become apparent from the following specification taken in connection with the accompanying drawings.

DESCRIPTION OF THE PREFERRED EMBODIMENT

Figure 1:
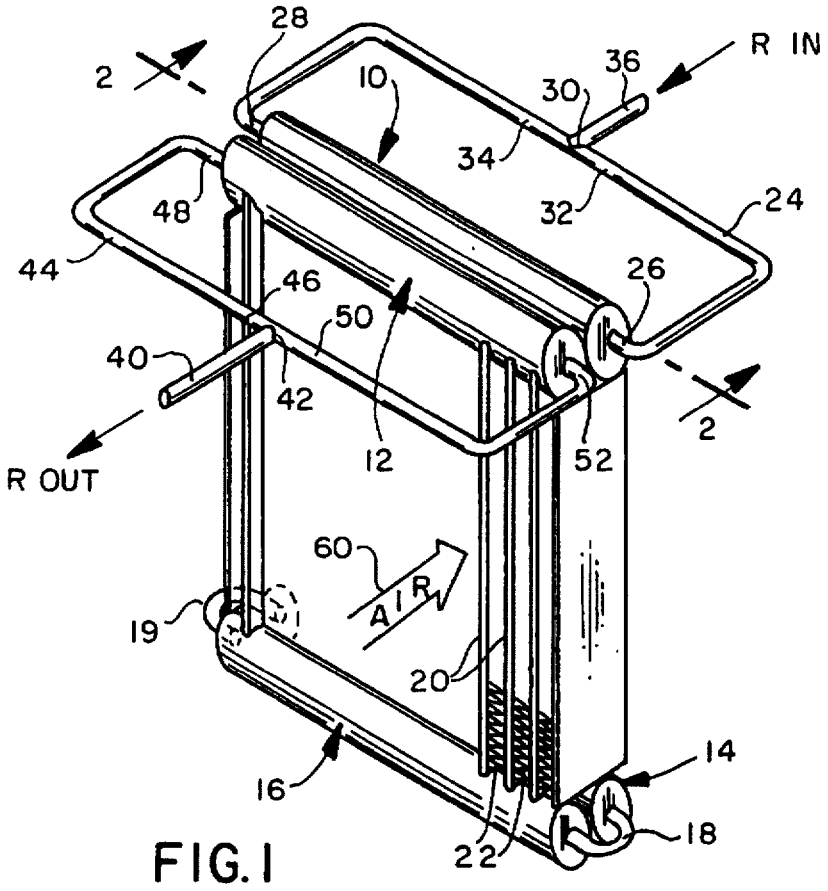
FIG. 1 is a perspective view of a two-pass evaporator made according to the invention.

An exemplary embodiment of an evaporator made according to the invention is illustrated in FIG. 1 in the form of a two-pass, counter/cross-current evaporator. However, it is to be understood that the principles of the invention are applicable to a single pass evaporator as well as to a multiple pass evaporator having more than two passes.

As seen in FIG. 1, the evaporator includes an inlet header, generally designated 10 and an outlet header, generally designated 12. Both may be cylindrical section and formed of tubes having a circular cross section. The evaporator also includes a pair of intermediate headers, generally designated 14 and 16, respectively, which are in side-by-side relation, as are the headers 10 and 12, and which are spaced from the headers 10 and 12 and parallel with respect thereto. Two U-shaped tubes 18 and 19 at each end of the headers 14 and 16 establish fluid communication between the interiors of each. The plurality of individual tubes 20, which are preferably conventional flattened tubes, are arranged in two rows (only one of which is shown). One row of the tubes 20 extends between the inlet header 10 and the intermediate header 14 and has the ends of the corresponding tubes 20 in fluid communication with the interior of both the 10 headers 10 and 14. A second row of the tubes 20 extends between the headers 12 and 16 and has the ends of each tube 20 in such row in fluid communication with the interior of the headers 12 and 16.

The tubes 20 in each of the rows are spaced from one another and fins such as serpentine fins 22 are disposed between the adjacent ones of the tubes 20 in the spaced therebetween and are bonded to such tubes as is well-known.

A generally C-shaped conduit 24 has opposed ends 26 and 28 which are located at corresponding opposite ends of the header 10 and in fluid communication with the interior thereof. Preferably, midway between the ends 26 and 28, the conduit 24 includes a tee 30 with branches 32 and 34 extending to the ends 26 and 28, respectively, and a branch 36 adapted to be connected, for example, to a condenser (not shown) in a refrigeration system which is designed to condense refrigerant received from a compressor (not shown) in such a system. As is well-known, such a compressor will typically receive refrigerant in the vapor phase from an evaporator such as the evaporator shown in FIG. 1. Refrigerant flow through such a compressor is taken from a branch 40 of a tee 42 located in a C-shaped conduit 44. A branch 46 of the tee 42 is in fluid communication with an end 48 of the conduit 44 while a branch 50 extends to an end 52 of the conduit 44. The ends 48 and 52 are in fluid communication with the interior of the outlet header 12 at opposite ends thereof.

In operation, refrigerant is introduced into the inlet header 10 via the conduit 24 and flows therefrom through the associated row of tubes 20 (not shown) to the intermediate header 14. The refrigerant flows out from both ends of the first intermediate header 14 through the U-shaped tubes 18 and 19. The refrigerant then flows into intermediate header 16 from both ends thereof. From there, the refrigerant flows upwardly through the second row of tubes 20 to the outlet header 12. From the outlet header 12, the refrigerant flows through the conduit 44 to the branch 40 to be returned to the condenser. For maximum performance, air flow is in the direction of an arrow 60 and for that direction of air flow, it will be appreciated that the incoming refrigerant flows from the rear of the evaporator to the front, that is, in opposition to the direction of air flow as indicated by the arrow 60 to provide a countercurrent flow. In addition, because the tubes 20 extend across the heat exchange area through which the air flow is occurring, the evaporator has cross current characteristics as well.

The description of the inlet header being a tube with circular C-shaped conduits is shown for clarity. In actual application, it is likely that the headers and inlets and outlets will all be incorporated into a built-up layer or laminated structure.

Figure 2:
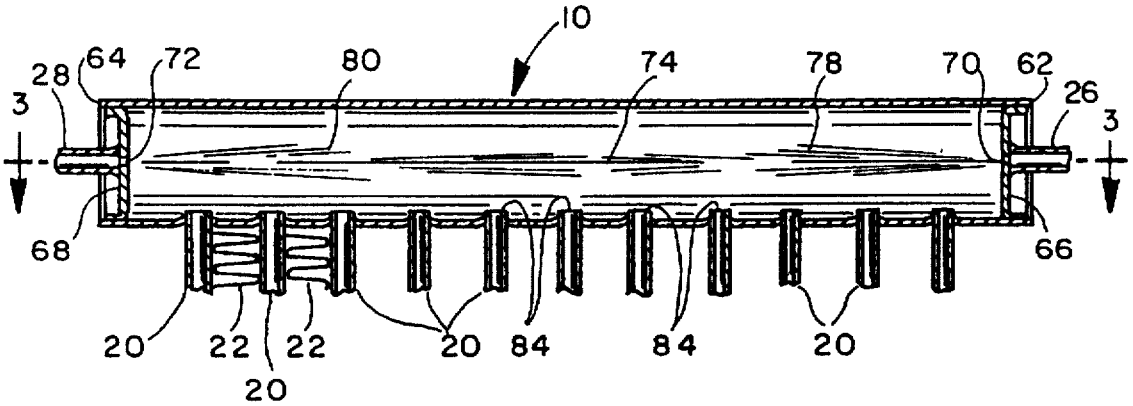
FIG. 2 is a sectional view of an inlet header and taken approximately along the line 2—2 in FIG. 1.
Figure 3:
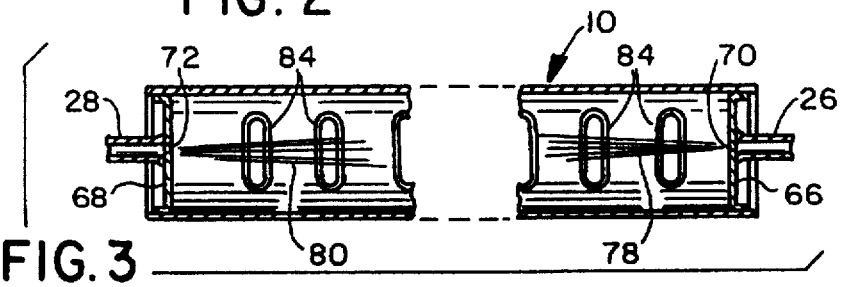
FIG. 3 is a fragmentary sectional view of the inlet header taken approximately along the line 3—3 in FIG. 2.

Turning now to FIGS. 2 and 3, it can be seen that the ends 62 and 64 of the inlet header 10 are closed and sealed by cup-shaped plugs 66 and 68, respectively. Each of the plugs 66 and 68 includes a central opening 70, 72 which is located on and directed along the longitudinal axis 74 of the header 10. The ends 26 and 28 of the conduit 24 are sealed to the exterior of the cups 66 and 68 about the openings 70 and 72, respectively. Thus, incoming refrigerant to the branch 36 of the tee 30 flows through the C-shaped conduit 24 to the ends 26 and 28 thereof and is introduced generally axially through the openings 70 and 72 in the form of two streams 78 and 80 which are directed toward one another.

The tubes 20 have open ends 84 within the interior of the inlet header as can be seen in FIGS. 2 and 3 disposed along the length of the same.

In operation, the liquid phase component of the incoming streams 78 and 80, due to the momentum resulting from flow through the system, will be directed generally along the axis 74 to collide or impinge upon one another. That in turn dissipates the kinetic energy that would tend to cause the incoming refrigerant to pool at the end 64 of the header 10 if only the inlet opening 70 were used or which would pool at the end 62 if only the inlet opening 72 were to be used. Because these streams typically include some vapor as well, they do not break up precisely at the midpoint of the header 10, but rather over a substantial portion of the length of the header 10. As a consequence, refrigerant in the liquid phase is distributed with substantial uniformity along the entire length of the header 10 so that there will be uniform flow of the refrigerant to individual ones of the tubes 20 from one side of the evaporator to the other. As a consequence, the aforementioned causes of inefficiency in evaporators are substantially minimized or eliminated all together.

To maximize uniformity of flow, the previously described arrangement utilizing two U-shaped tubes 18 and 19 for transfer between the intermediate headers 14 and 16 and an outlet conduit 44 generally similar to the inlet system may be used. Indications suggest that an improvement in the efficiency of the evaporator in the range of about 7–10 percent are achieved over conventional, one inlet evaporator structures.

The description of the operation of the inlet header 10 also applies to the second intermediate header 16 which has two incoming streams impinging on each other to distribute the fluid more uniformly along the length of the header 16.

The outlet header 12 has two outlets to the conduit ends 26,28 which direct flow from both ends of the header 12 to promote uniformity of outlet resistance by providing outlets on both ends. The first intermediate header 14 likewise has two outlet ports to the tubes 18 and 19 which direct refrigerant out from both ends to equalize resistance. The refrigerant from the one end of the first intermediate header is directed into the adjacent end of the second intermediate header. This provides a shortest path for refrigerant from both ends of the headers.

The overall effectiveness of the system is enhanced by the combination of an inlet header with two inlets at opposite ends, an outlet header with two outlets at opposite ends and a pair of intermediate headers connected at both ends by a pair of ports. Such a system overcomes the problems due to the differences in friction between fluids and gases, and improves distribution of the fluid evenly through the headers and consequently the tubes. The input ports at opposite ends of the input header and second intermediate header provide two streams directed toward each other and evenly distribute the refrigerant along the header. The use of the outlets at opposite ends of the output header and first intermediate header tends to equalize the flow resistance in the many flow paths and thus promotes a More uniform flow regimen across the evaporator for maximum efficiency.

We claim:

1. An evaporator for a refrigerant of the like comprising:

means defining a plurality of hydraulically parallel flow paths for a fluid to be evaporated, each flow path having first and second ends;

an inlet header including an elongated inlet channel at said first ends and in fluid communication thereat with each of said flow paths;

an outlet header at said second ends in fluid communication thereat with each of said flow paths; and a pair of inlets to said inlet channel at opposite ends thereof and directed toward each other so that fluid to be evaporated and entering said inlets will be in the form of two streams impinging upon one another to improve the uniformity of distribution of said fluid among said flow paths.

2. The evaporator of claim 1 wherein said inlet header is a tube and said inlet channel is defined by the interior of the tube.

3. The evaporator of claim 2 wherein said tube is straight.

4. The evaporator of claim 2 wherein said inlets are directed generally axially along said tube interior.

5. The evaporator of claim 1 wherein said flow path defining means comprise a plurality of spaced tubes extending between said headers; and fins between said spaced tubes.

6. The evaporator of claim 1 wherein said flow path defining means provides a multiplicity of passes of each said flow path across a heat exchange area.

7. An evaporator for a refrigerant or the like comprising:

means defining a plurality of hydraulically parallel flow paths for a fluid to be evaporated, each flow path having first and second ends;

an inlet header at said first ends in fluid communication thereat with each of said flow paths;

an outlet header including an elongated outlet channel at said second ends and in fluid communication thereat with each of said flow paths; and a pair of outlets to said outlet channel at opposite ends thereof and directed away from each other so that fluid leaving said outlets will be in the form of two streams diverging from one another to reduce outlet resistance and improve the uniformity of distribution of said fluid among said flow paths.

8. An evaporator for use in a refrigeration system comprising:

a plurality of tubes in hydraulic parallel and in spaced relation to one another;

fins extending between and mounted to said tubes;

an elongated header extending between said tubes and in fluid communication with the interior of each said tube; and two spaced ports in said header for generating two generally oppositely directed streams of fluid that provide a more uniform distribution of fluid through said tubes.

9. An evaporator for use in a refrigeration system comprising:

a plurality of tubes in hydraulic parallel and in spaced relation to one another;

fins extending between and mounted to said tubes;

an elongated header extending between said tubes and in fluid communication with the interior of each said tube;

two spaced ports in said header for generating two streams of fluid that provide a more uniform distribution of fluid through said tubes;

a generally C-shaped conduit interconnecting said ports; and a tee in said conduit through which a fluid to be evaporated may be introduced into said conduit for flow to both said ports.

10. The evaporator of claim 9 wherein said header is a tube of generally circular cross-section and said ports are at opposite ends thereof and generally axially aligned with one another.

11. The evaporator of claim 10 wherein said header is an inlet header, said ports are directed towards each other and said streams of fluid impinge upon each other to dissipate kinetic energy.

12. The evaporator of claim 10 wherein said header is an outlet header, said ports are directed away from each other so that fluid flows out said header in two directions.

13. An evaporator for use in a refrigeration system comprising:

an elongated header;

two ports, one at each end of said header, said ports facing each other;

a common conduit interconnecting said ports; and a plurality of spaced tubes extending from said header and each having an open end within said header, said open ends being disposed along the length of said header.

14. The evaporator of claim 13 wherein said header is an inlet header and fluid flows into said inlet header through said ports to form two streams that impinge upon each other.

15. The evaporator of claim 13 wherein said header is an outlet header and fluid flows out from said outlet header from said ports.

16. An evaporator for use in a refrigeration system comprising:

a first elongated header;

spaced facing ports to said first header, one at each end thereof;

a first plurality of spaced tubes extending from said first header and each having an open end within said first header, said open ends being disposed along the length of said first header;

a second elongated header;

spaced facing ports to said second header, one at each end thereof;

a second plurality of spaced tubes extending from said second header and each having an open end within said second header, said open ends being disposed along the length of said second header; and a pair of common conduits interconnecting one of said first header ports to one of said second header ports and connecting the other of said first header ports to the other of said second header ports.

17. The evaporator of claim 16 further comprising:

an inlet header;

spaced facing ports to said inlet header, one at each end thereof; and a common conduit interconnecting said ports;

wherein said first plurality of tubes each have another open end within said inlet header, said open ends being disposed along the length of said first header.

18. The evaporator of claim 17 further comprising:

an outlet header;

spaced facing ports to said outlet header, one at each end thereof; and a common conduit interconnecting said ports;

wherein said second plurality of tubes each have another open end within said outlet header, said open ends being disposed along the length of said second header.

19. The evaporator of claim 18 wherein said inlet header is in side-by-side relation to said outlet header, said first header is in side-by-side relation to said second header and said pair of conduits interconnect adjacent ends of said intermediate headers.

20. An evaporator for use in a refrigeration system comprising:

an inlet header including an elongated inlet channel;

an outlet header in side-by-side relation to said inlet header, said outlet header including an elongated outlet channel;

first and second intermediate headers in side-by-side relation, spaced and parallel to said inlet and outlet headers each said intermediate headers including an elongated channel;

first and second rows of tubes, each tube in said first row in fluid communication with said inlet channel and said first intermediate channel, and each tube in said second row in fluid communication with said outlet channel and said second intermediate channel;

a pair of inlets to said inlet channel at opposite ends thereof;

a pair of outlets from said outlet channel at opposite ends thereof;

a pair of outlets from said first intermediate channel at opposite ends thereof; and a pair of inlets to said second intermediate channel at opposite ends thereof.

21. The evaporator of claim 20 wherein said inlet channel and outlet channel are in side-by-side relation to each other and said first and second intermediate channels are in side-by-side relation.

22. The evaporator of claim 21 further comprising a pair of U-shaped tubes, said tubes connecting said intermediate channels at said ends so that each of said output inlets of said first intermediate channel is in direct fluid communication with the adjacent of said input channels on both sides of said intermediate channels.

*23. An evaporator for use in a refrigeration system comprising:*

*a plurality of tubes in hydraulic parallel and in spaced relation to one another;*

*fins extending between and mounted to said tubes;*

*an elongated header having ends facing each other spaced lengthwise of the header and a center equally spaced between said ends, with the elongated header extending between said tubes and in fluid communication with the interior of each said tube; and*

*two spaced ports in said header wherein said ports are each closer to an end of said header than to the center of said header to provide a more uniform distribution of fluid through said tubes.*

*24. An evaporator for use in a refrigeration system comprising:*

*an elongated header having ends spaced lengthwise of the header and a center between said spaced ends;*

*two ports, one proximate each end of the header, with said ports being closer to the ends of the header than to the center thereof;*

*a common conduit interconnecting said ports; and*

*a plurality of spaced tubes extending from said header and each having an open end within said header, said open ends being disposed along the length of said header.*

*25. The evaporator of claim 24 wherein said header is an inlet header and fluid flows into said header through said ports.*

*26. The evaporator of claim 24 wherein said header is an outlet header and fluid flows out from said outlet header from said ports.*

* * * * *